United States Patent [19]

Yamagishi et al.

[11] Patent Number: 4,615,834

[45] Date of Patent: Oct. 7, 1986

[54] PROCESS AND APPARATUS FOR PRODUCING MICROSPHERES OF FISSILE AND/OR FERTILE MATERIALS

[75] Inventors: Shigeru Yamagishi; Yoshihisa Takahashi; Koreyuki Shiba, all of Ibaraki, Japan

[73] Assignee: Japan Atomic Energy Research Institute, Tokyo, Japan

[21] Appl. No.: 578,615

[22] Filed: Feb. 13, 1984

[30] Foreign Application Priority Data

Feb. 14, 1983 [JP] Japan ................................. 58-22300

[51] Int. Cl.⁴ ...................... G21C 19/00; G21C 21/00
[52] U.S. Cl. .................................... 252/635; 264/0.5; 422/159
[58] Field of Search ................. 252/634, 635; 264/0.5, 264/4.3; 422/159

[56] References Cited

U.S. PATENT DOCUMENTS

| | | | |
|---|---|---|---|
| 3,329,745 | 7/1967 | La Grange | 252/635 X |
| 3,586,742 | 6/1971 | Chin et al. | 252/635 X |
| 3,790,492 | 2/1974 | Fulwyler | 252/635 X |
| 3,888,787 | 6/1975 | Hein et al. | 252/635 X |
| 3,933,679 | 1/1976 | Weitzel et al. | 252/635 X |

OTHER PUBLICATIONS

Zimmer et al.: Trans. Amer. Nucl. Soc., 20, 591–593, (1975).
Forthmann et al.: JUL–655–RW (1970).
"Proceedings of a Panel on Sol–Gel Processes for Ceramic Fuels, Vienna, May 6–10, 1968", (IAEA, Vienna, 1968).
Brambilla et al.: Energia Nucleare, 17, 217–224 (1970).
Ringel et al.: Nucl. Technol., 45, 287–298, (1979).
Naefe et al.: Nucl. Technol., 42, 163–171, (1979).

Primary Examiner—Teddy S. Gron
Assistant Examiner—Virginia B. Caress
Attorney, Agent, or Firm—Browdy and Neimark

[57] ABSTRACT

A process and an apparatus are, herein, disclosed for producing microspheres of fissile and/or fertile materials with a high degree of sphericity from a feed solution starter containing at least one metal salt selected from among thorium, uranium and plutonium by using as a gelling medium an organic solvent that has a higher density and a greater interfacial tension with water than the feed solution and which is capable of dissolving ammonia.

13 Claims, 1 Drawing Figure

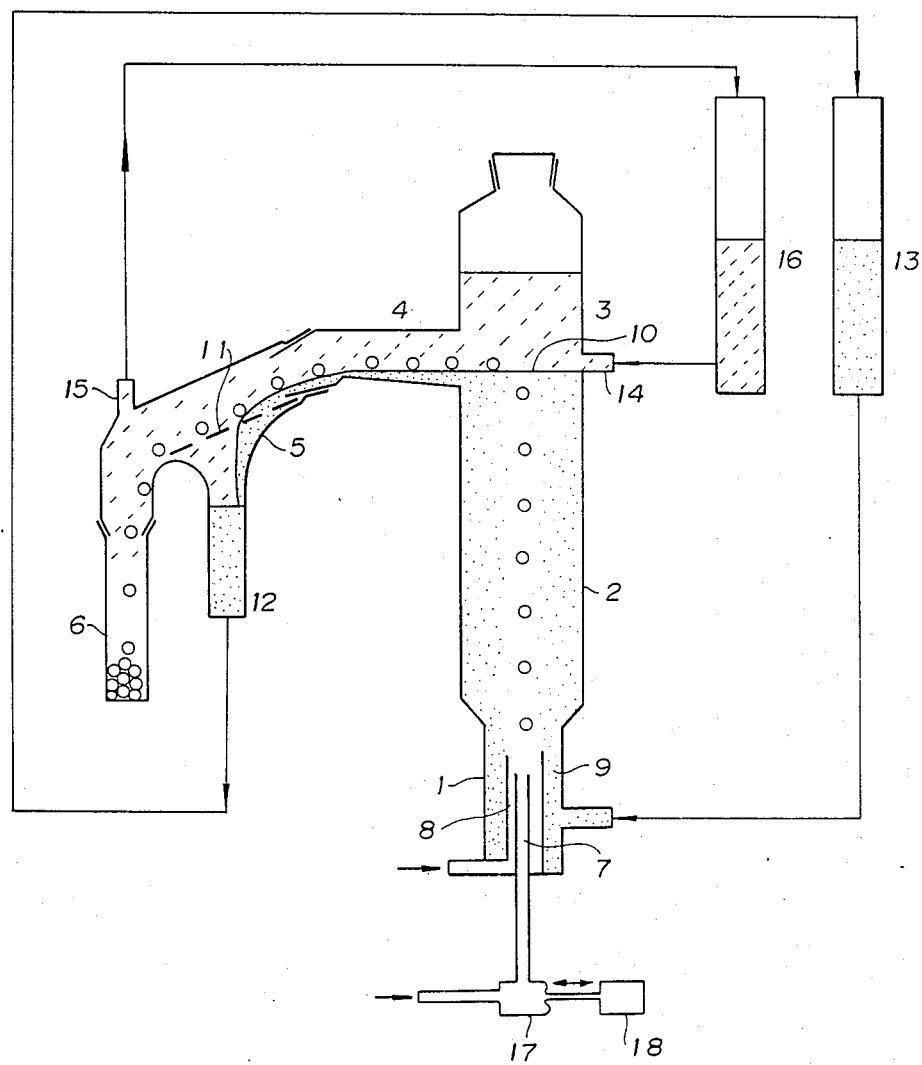

PROCESS AND APPARATUS FOR PRODUCING MICROSPHERES OF FISSILE AND/OR FERTILE MATERIALS

BACKGROUND OF THE INVENTION

1. Field of the Invention

The present invention relates to a process and an apparatus for producing microspheres of fissile and/or fertile materials.

2. Description of the Prior Art

Nuclear fuels in a spherical particulate form used in high temperature gas-cooled reactor (HTGR) and other types of nuclear reactors are conventionally produced by either the dry process such as powder metallurgical technology or the wet process such as ion exchange resin technique, hydrolysis (H process), sol-gel process and gel precipitation technique. The method using hydrolysis is also known as the internal gelling method, and in this method, a feed, solution prepared by dissolving hexamethylenetetramine or the like in an aqueous solution of a nuclear fuel material such as thorium, uranium or plutonium is divided into small droplets which are gelled by ammonia formed as a result of decomposition of the hexamethylenetetramine upon heating said droplets to elevated temperatures. The sol-gel process and gel precipitation technique are sometimes collectively referred to as the external gelling method. In the sol-gel process, a sol is used as the feed solution, and in the gel precipitation technique, an aqueous solution is used as the feed solution. In either method, ammonia and other gelling agents are caused to act externally on small droplets of the feed solution. In the conventional external gelling method, the resulting gel particles are finally recovered into ammonia water or other ammoniacal aqueous solutions. The gelling step consists of the following three stages:

(1) forming small droplets of the feed solution in a gaseous medium or organic solvent medium which has lower density than the ammoniacal aqueous solution for recovery and which forms a separate phase from said aqueous solution and letting the droplets fall by gravity;

(2) passing the droplets of a uniform size through an ammoniacal gaseous or organic solvent medium so that the shell or the outer skin of each droplet is sufficiently gelled to prevent its deformation at the time when it passes through the interface between the gaseous or organic solvent medium and the ammoniacal aqueous solution for recovery; and (3) completing the gellation of the droplets in the ammoniacal aqueous solution.

The gelled particles are subsequently washed, dried and sintered to produce the final product. The sphericity of the final product generally depends on the sphericity of the gel particles. The greater the surface tension of the ungelled droplets that tends to contract them into a completely spherical form or the smaller the force that will deform the droplets into a non-spherical shape, the closer to complete sphericity the particles of the final product are.

If the feed solution is converted into small droplets and their shell or outer skin is gelled in a gaseous medium rather than in an organic solvent, the great surface tension at the interface with the feed solution ensures the production of small droplets having a higher degree of sphericity, but on the other hand, the droplets fall so rapidly that they receive a great impact when they enter the aqueous solution in the recovery step. Therefore, if the size of the droplets is not sufficiently small, they do not have sufficient time to provide a hard skin before they enter the aqueous solution, and the impact to which the droplets are subjected at the time they enter the aqueous solution makes it impossible to produce completely spherical particles.

In some cases, an organic solvent such as methyl isobutyl ketone is used as the medium in which the feed solution is converted to small droplets and their skin is gelled. However, organic solvents have small surface tension at the interface with water (ca. 10 dyne/cm for methyl isobutyl ketone), and if the size of the droplets is not sufficiently small, they have only a low degree of sphericity even before they are dropped into the gelling aqueous solution. If droplets about 1.7 mm in diameter prepared from a sol containing 1 mol of thorium per liter are gelled, particles of thorium oxide having a diameter of about 500 $\mu$m are formed but their sphericity is about 1.1. Thorium oxide particles having a diameter of about 600 $\mu$m prepared from droplets with a diameter of about 2.0 mm have a sphericity of about 1.2 and also cannot be described as spherical particles.

None of the organic solvents available that have a lower density than the aqueous solution for recovery are cheap enough to be used in great quantities. Furthermore, the ability of these solvents to dissolve ammonia and their surface tension at the interface with water are so small that they cannot be employed in the external gelling method. Therefore, it has been difficult for the existing external gelling techniques to produce large particles with a higher degree of sphericity.

SUMMARY OF THE INVENTION

As a result of various studies to solve these problems, we have hit upon the idea of using inexpensive organic solvents which have a great surface tension at the interface with water (e.g. carbon tetrachloride has a surface tension of 47 dyne/cm at the interface with water) and which are capable of dissolving ammonia to some extent. These solvents have been found unsuitable for use in the external gelling method only because they have a higher density than the feed solution and the aqueous solution for recovery of gel balls. According to our finding, these solvents can be used as a medium for forming small droplets from the feed solution and for gelling the skin of each droplet in the external gelling method. The resulting microspheres of fissile and/or fertile materials are larger than the conventional products and they still have a high degree of sphericity.

Therefore, the primary object of the present invention is to provide a process for producing microspheres of fissile and/or fertile materials with a high degree of sphericity from a feed solution containing at least one metal selected from among thorium, uranium and plutonium by using as a gelling medium an organic solvent that has a higher dynsity that the feed solution and a sufficient interfacial tension with water to permit spherical droplets to be formed from the feed solution and which is capable of dissolving ammonia. The present invention relates to a variation of the external gelling method using ammonia as the gelling agent.

Another object of the present invention is to provide an apparatus to be used in performing this process.

Other objects and advantages of the present invention will become apparent by reading the following description.

BRIEF DESCRIPTION OF THE DRAWING

The drawing shows schematically one embodiment of the apparatus for implementing the process of the present invention.

DETAILED EXPLANATION OF THE INVENTION

The external gelling method of the present invention uses (1) a feed solution containing at least one of thorium, uranium and plutonium, (2) an organic solvent as a medium in which small droplets are formed from the feed solution and their skin is gelled, and (3) an ammoniacal aqueous solution in which the gelation of the droplets is completed and into which the gelled balls are recovered. Of these three materials, the organic solvent has the highest density and the ammoniacal aqueous solution has the lowest density. This is the reason why the process of the present invention is preferably implemented by an apparatus shown schematically in the accompanying drawing.

The apparatus shown comprises:

(1) a container for a feed solution containing at least one metal selected from among thorium, uranium and plutonium;

(2) a gelling column connected to said container and which consists of (a) a nozzle section for forming small droplets of the feed solution, (b) an intermediate section filled with an ammoniacal organic solvent for forming a gelled shell, and (c) an upper section filled with an ammoniacal aqueous solution for completing the gelation;

(3) a separating section connected to said gelling column for separating the spherical gel particles from the organic solvent; and (4) a vessel connected to said separating section for recovering the spherical gel particles.

In the embodiment shown, the gelling column 2 is positioned upright. This column is composed of a base portion having a nozzle section 1 for forming small droplets from the feed solution, an intermediate portion 2 filled with an ammoniacal organic solvent for gelling the skin of each droplet, and an upper portion 3 filled with an ammoniacal aqueous solution for completing the gelation of the droplets. A pipe 4 extends horizontally from the interface between the intermediate and upper sections and is connected to a downwardly inclined section 5 where the gel balls are separated from the organic solvent. The separating section is further connected to a vessel 6 for recovery of the gel balls. The nozzle section 1 has a concentric arrangement of three pipes: an inner pipe providing a passageway 7 for the feed solution, an intermediate pipe providing a passageway 8 for an ammonia-free organic solvent, and an outer pipe providing a passage 9 for an ammoniacal organic solvent. The top of the inner pipe is in a lower position than the top of the intermediate pipe. The outer pipe may be integral with or connected to the wall of the intermediate section of the column. In the nozzle section, the three liquid streams flow upwardly. With the arrangement described above, the small droplets of the feed solution formed at the top of the inner pipe in the nozzle section acquire a stable form as they ascend through the ammonia-free organic solvent until they come into contact with the ammoniacal organic solvent. In the intermediate section 2 above the nozzle section, the surface of each droplet gels and ascends together with the ammoniacal organic solvent. The droplets having a gelled skin reach the interface 10 between the ammoniacal organic solvent and the overlying ammoniacal aqueous solution, and as they travel horizontally through pipe 4 on the interface, not only the exterior but also the interior of the droplets is gelled to provide gel balls. The gel balls overflow from the other end of the pipe 4 together with the organic solvent, and they are transferred to the vessel 6 after travelling on a separator 11 which is in the form of a grating or screen positioned in the separating section 5. The overflowing organic solvent falls through the openings in the separator and is thus separated from the gel balls. The organic solvent is discharged through an outlet 12, and after being regenerated in an ammonia replenisher 13, the solvent is recycled to the nozzle section 1. In order to aid in the overflowing of the gel balls and to compensate for the ammonia lost during the gelling of the droplets, the ammoniacal aqueous solution is constantly supplied into the upper section 3 of the column through an inlet 14 on the side opposite to the pipe 4, and is discharged through an outlet 15 on the separating section 5 for being recycled to the interface between the ammoniacal organic solvent and the ammoniacal aqueous solution after passing through another ammonia replenisher 16. In order to form a concave interface in the liquid within the pipe 4 during the overflowing of the gel balls, the inner wall of that part of the pipe 4 which is in contact with the interface is made of Teflon TM or any other material that is more wettable with the organic solvent than with water. The surface of the grating or screen used as the separator 11 is preferably made of two different materials, one of which is Teflon TM or any other material that is more wettable with the organic solvent than with water and is disposed upstream of the flow of the gel balls, and the other being stainless steel or any other material that is more wettable with water and is disposed downstream of the flow of the gel balls. This arrangement ensures the correct guiding of the organic solvent from the interface toward the outlet 12 and prevents its flowing into the vessel 6 wherein only the gel balls should be accommodated.

The arrangement described above is sufficient for the purposes of the present invention if small droplets are formed from the feed solution spontaneously by using the balance between the interfacial tension and buoyancy. The small droplets may also be formed by using external vibration. In this case, a hydraulic vibration 17 is positioned halfway along the channel connecting the tank for the feed solution and the nozzle section. This device may be composed of a small compartment 17 having a thin wall made of rubber or other flexible material, and this compartment is connected to a vibrator 18 which vibrates that thin wall. This causes variations in the pressure of the feed solution and these variations are transmitted to the top of the nozzle section so that the solution is divided into small droplets. This phenomenon may be called "hydraulic vibration" and is effectively used in the present invention.

The advantages of the external gelling method of the present invention are hereunder described by reference to working examples, which are given here for illustrative purposes only.

EXAMPLES 1 to 9

In Examples 1, 3, 4, 5 and 9, a thorium nitrate solution was used as a feed solution starter. In Examples 2, 6, 7 and 8, a solution of thorium nitrate and uranyl nitrate in mixture was used as a feed solution starter. To each of the feed solutions, less than an equivalent amount of ammonia water was added and the mixture was heated under agitation at a controlled pH to form a sol having a final pH of 3.05 (at 25° C.). The sol was used as the feed solution. Carbon tetrachloride was used as an organic solvent in which small droplets formed from the feed solution and their skin was gelled. Ammonia water was used as an aqueous solution in which the gelation of the droplets was completed and into which the gelled balls were recovered. The greater part of the gelling apparatus used which is shown schematically in the accompanying drawing is made of glass. Both the upper and intermediate sections 3 and 2 of the gelling column were in the form of a pipe 1 m high with an inside diameter of 45 mm. The base of the intermediate section 2 was provided with a taper ( ℘ 29/26) for connection with the nozzle section 1. A pipe 4 which was 15 cm long was connected to the interface of the upper and intermediate sections and its far end was provided with a tapered joint ( ℘ 29/42) sloping downwardly at an inclination of about 2/5. The pipe 4 and that part of the column at the interface between the upper and intermediate sections were intimately lined with a Teflon sheet 1 mm thick. A separating section 5 was connected to the pipe 4 by a flared joint ( ℘ 29/26). The tapered joint extending from the pipe 4 was longer than the flared joint, so the former partially protruded into the separating section 5. A grating used as the separator 11 was inserted into the space between the protruding part of the tapered joint and the inner wall of the separating section, and this arrangement ensured that an overflow of the gel balls coming from the pipe 4 would be correctly guided onto the grating. The grating was composed of ten-odd stainless steel rods with a diameter of 1 mm which were pierced at an interval of 3 mm into four rectangular Teflon bars 2 mm thick and 1 mm wide that were disposed at an interval of 2.5 cm. Each of those stainless steel bars extending a length of 10 cm upstream of the flow of gel balls was sheathed with a Teflon tube having an outside diameter of 2 mm and an inside diameter of 1 mm. The nozzle section 1 consisted of three pipes; the outer pipe was made of a glass tube having an outside diameter of 20 mm and an inside diameter of 18 mm, and the intermediate pipe was also made of a glass tube having an outside diamter of 12 mm and an inside diameter of 10 mm, with a glass tube (not shown) having an outside diameter of 6 mm and an inside diameter of 4 mm being disposed within the intermediate pipe as a guide for positioning the inner pipe (the nozzle through which the feed solution was to be supplied) at the center of the nozzel section. The inner pipe was made of a Teflon TM or polyethylene tube having an outside diameter of 3 mm and an inside diameter of 1 mm. The inside diameter at the top of this inner pipe was tapered to 0.65 mm (when a vibrator was used) and 0.075 mm (when no vibrator was used). In either case, the Teflon TM or polyethylene tube was positioned within the glass guide tube. When a hydraulic vibrating device 17 was used, the distance between the top of the inner pipe and the device was selected at 60 cm. In the nozzle section having the arrangement described above, ammoniacal carbon tetrachloride was caused to flow at a rate of 180 ml/min and pure (ammonia-free) carbon tetrachloride was caused to flow at a rate of 2-3 ml/min. The sol used as the feed solution was caused to flow at a rate of 3.65 or 7.40 ml/min in the presence of a vibrator, and at a rate of 0.24 ml/min when no vibrator was used. Ammonia water that would aid in the overflowing of gel balls was caused to flow at a rate of 100-200 ml/min. In an ammonia replenisher 13, ammonia gas was bubbled at a rate of 400-600 ml/min, and the regenerated ammoniacal carbon tetrachloride was directed to the passage 9 at the base of the column. With the apparatus and conditions shown above, the nine samples of sol were treated to form gel balls. The balls were then washed, dried and sintered to provide spherical particles of thorium oxide and mixed oxide of thorium and uranium having the sizes shown in the following table, which also lists the degrees of sphericity of the respective particulate samples.

TABLE

| Example No. | Sol concentration (mol/l) | | Conditions for making small droplets | | Properties of sintered oxide particles | |
|---|---|---|---|---|---|---|
| | Thorium | Uranium | Innermost pipe for supplying the feed solution* | Number of vibrations (Hz) | Average diameter ($\mu$m) | Sphericity |
| 1 | 1.0 | 0 | A | no vibration | 621 | 1.03 |
| 2 | 0.8 | 0.2 | A | no vibration | 679 | 1.03 |
| 3 | 1.0 | 0 | B | 3 | 1079 | 1.07 |
| 4 | 1.0 | 0 | B | 8 | 755 | 1.04 |
| 5 | 1.0 | 0 | B | 12.5 | 659 | 1.01 |
| 6 | 0.7 | 0.3 | B | 25 | 476 | 1.04 |
| 7 | 0.75 | 0.25 | B | 25 | 482 | 1.04 |
| 8 | 0.9 | 0.1 | B | 50 | 493 | 1.02 |
| 9 | 1.0 | 0 | B | 50 | 500 | 1.01 |

*A: polyethylene tube with I.D. 0.075 mm
B: Teflon tube with I.D. 0.65 mm

As already mentioned, the conventional technique of the external gelling method produces particles having a sphericity of 1.1 when their diameter is 500 $\mu$m and a sphericity of 1.2 for a diameter of 600 $\mu$m. However, the modified method of the present invention produced particles having a much higher degree of sphericity.

When the method of the present invention was performed with a gelling column wherein the surface of the part at the interface between the ammoniacal carbon tetrachloride and the ammoniacal aqueous solution was made of glass which was more wettable with water than with carbon tetrachloride, the resulting gel particles built up in the layer of carbon tetrachloride and could not be wetted with ammonia water. As a result, the gelation of spherical particles was not completed and the recovery of the desired particles was impossible. When the separator 11 was in the form of a grating or screen made of stainless steel which was more wettable with water than with carbon tetrachloride, the carbon tetrachloride fell into the recovery vessel and as a result, the gel particles that had been recovered in that vessel broke into pieces. As the data for Examples 1 and 2 shows, when the process of the present invention was performed without a vibrator, the inside diameter of the innermost pipe in the nozzle section had to be very small, and furthermore, precision machining of its inside bore was necessary for ensuring exact control over the size of the particles of the final product. For these reasons, the production of particles having various sizes was practically impossible in the absence of a vibrator. However, when a vibrator was used as in Examples 3 to 9, products having different sizes could be formed using one and the same nozzle. In the external gelling method of the present invention, the nozzle section is unavoidably positioned at the base of the gelling column and a conventional vibrating technique that causes the mechanical vibration of the nozzle per se is difficult to use. This is because the joint connecting the vibrating innermost pipe and the non-vibrating part of the nozzle section is in direction contact with a corrosive organic solvent and precludes the use of rubber or other shock-absorbing material at that joint.

What is claimed is:

1. A process for producing microspheres of fissile and/or fertile materials by gelling in an ammoniacal atmosphere small droplets of a feed solution prepared from a feed solution starter containing at least one metal salt selected from among thorium, uranium and plutonium and subsequently washing, drying and sintering the gelled droplets to produce an oxide, of the metal or metals in the form of spherical particles, wherein the small droplets of the feed solution are formed within an organic solvent having a higher density than the feed solution and a sufficient interfacial tension with water to permit spherical droplets to be formed from said feed solution and which organic solvent has the ability to dissolve ammonia, the resulting droplets being gelled first in the ammonia-containing organic solvent, then in an ammoniacal aqueous solution having a lower density than said organic solvent and said feed solution, and which is overlying and interfacing with said organic solvent, and the gelled particles being recovered into said ammoniacal aqueous solution.

2. A process according to claim 1 wherein spherical particles of thorium oxide are produced from a thorium-containing sol in the presence of carbon tetrachloride used as the organic solvent.

3. A processs according to claim 1 wherein spherical particles of a mixed oxide of thorium and uranium are produced from a sol containing both thorium and uranium in the presence of carbon tetrachloride used as the organic solvent.

4. A process according to claim 1 wherein microspheres of fissile and/or fertile materials are prepared by using an apparatus which comprises:
(1) a container for a feed solution prepared from a feed solution starter containing at least one metal salt selected from among thorium, uranium and plutonium;
(2) a gelling column connected to said container and which consists of (a) a nozzle section for forming small droplets of the feed solution, (b) an intermediate section filled with an ammoniacal organic solvent for forming a gelled shell, and (c) an upper section filled with an ammoniacal aqueous solution for completing the gelation;
(3) a separating section connected to said gelling column for separting the spherical gel particles from the organic solvent; and
(4) a vessel connected to said separating section for recovering the spherical gell particles.

5. A process according to claim 4 wherein said separating section is connected to a pipe which extends from the interface between the intermediate and upper sections of said column and one end of which is inclined downwardly.

6. A process according to claim 4 wherein said nozzle section consists of a concentric arrangement of three pipes which respectively provide an inner passage for the feed solution, an intermediate passage for the organic solvent, and an outer passage for the ammoniacal organic solvent.

7. A process to claim 4 wherein said separating section includes a separator with a surface made of two different materials, one of which is more wettable with the organic solvent than water and is positioned upstream of the flow of spherical gelled particles and the other of which is more wettable with water and is positioned downstream of the flow of said gelled particles.

8. A process according to claim 4 wherein said separating section includes means by which the spherical gelled particles transferred up to the interface between the ammoniacal organic solvent and the ammoniacal aqueous solution are caused to overflow said interface horizontally together with the organic solvent.

9. A process according to claim 5 wherein the inner wall of the column in contact with said interface is made of a material more wettable with the organic solvent than with water.

10. A process according to claim 7 wherein said material which is more wettable with the organic solvent than with water is made of Teflon TM.

11. A process according to claim 7 wherein said material which is more wettable with water than with the organic solvent is made of stainless steel.

12. A process according to claim 7 wherein said separator is a grating or screen.

13. A process according to claim 9 wherein said material which is more wettable with the organic solvent than with water is made of Teflon TM.

* * * * *